(12) United States Patent
Williams et al.

(10) Patent No.: US 9,403,521 B2
(45) Date of Patent: Aug. 2, 2016

(54) BRAKING COMPONENT REPLACEMENT SYSTEM AND METHOD

(71) Applicant: Meritor Heavy Vehicle Braking Systems (UK) Limited, Cwmbran, Gwent (GB)

(72) Inventors: Anthony Williams, Gwent (GB); Prashant Narula, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days.

(21) Appl. No.: 14/734,024

(22) Filed: Jun. 9, 2015

(65) Prior Publication Data
US 2015/0360671 A1   Dec. 17, 2015

(30) Foreign Application Priority Data

Jun. 13, 2014  (EP) .................................... 14172410

(51) Int. Cl.
| | | |
|---|---|---|
| G06F 19/00 | (2011.01) | |
| B60T 17/22 | (2006.01) | |
| B60T 13/74 | (2006.01) | |
| F16D 55/2255 | (2006.01) | |
| F16D 65/28 | (2006.01) | |
| F16D 65/62 | (2006.01) | |
| F16D 66/02 | (2006.01) | |
| F16D 65/00 | (2006.01) | |
| F16D 65/38 | (2006.01) | |
| F16D 121/08 | (2012.01) | |
| F16D 121/24 | (2012.01) | |

(52) U.S. Cl.
CPC ............. B60T 17/221 (2013.01); B60T 13/746 (2013.01); F16D 55/2255 (2013.01); F16D 65/0043 (2013.01); F16D 65/28 (2013.01); F16D 65/62 (2013.01); F16D 66/02 (2013.01); *F16D 2065/386* (2013.01); *F16D 2121/08* (2013.01); *F16D 2121/24* (2013.01)

(58) Field of Classification Search
CPC . B60T 17/221; B60T 13/746; F16D 55/2255; F16D 65/28; F16D 66/02; F16D 66/0043; F16D 65/62
USPC ............................... 701/36, 70, 71; 477/4, 27
See application file for complete search history.

(56) References Cited

U.S. PATENT DOCUMENTS

| | | | |
|---|---|---|---|
| 5,848,672 A | | 12/1998 | Brearley et al. |
| 7,953,513 B2 * | | 5/2011 | Bhat ....................... B29C 49/78 700/17 |
| 8,898,633 B2 * | | 11/2014 | Bryant ................. G05B 19/056 717/106 |
| 2008/0018172 A1 | | 1/2008 | Bachle |
| 2008/0190712 A1 | | 8/2008 | Hagberg |
| 2012/0006633 A1 | | 1/2012 | Pahle |

FOREIGN PATENT DOCUMENTS

| | | |
|---|---|---|
| CN | 102419347 A | 4/2012 |
| DE | 19639005 A1 | 3/1998 |
| DE | 102006013509 A1 | 9/2007 |
| DE | 102009015364 A1 | 11/2009 |
| FR | 2935658 A1 | 3/2010 |
| KR | 20030049504 A | 6/2003 |
| KR | 20030060400 A | 7/2003 |
| KR | 20060015778 A | 2/2006 |
| KR | 100670563 B1 | 1/2007 |

OTHER PUBLICATIONS

European Patent Office, Extended European Search Report for the corresponding European Patent Application No. 14172410.4 mailed Feb. 16, 2015.

* cited by examiner

*Primary Examiner* — Gertrude Arthur Jeanglaude
(74) *Attorney, Agent, or Firm* — Brooks Kushman P.C.

(57) ABSTRACT

A method of replacement of replaceable components of a vehicle braking system are described, along with methods of controlling such replacement by preventing the or permitting removal of replaceable components of a braking system, in response to comparison of codes associated with current and replacement parts of the braking system. A related braking system and controller are also disclosed. The methods and related products can be used for ensuring the replacement of braking components with correctly specified replacement parts.

18 Claims, 4 Drawing Sheets

BRAKING COMPONENT REPLACEMENT SYSTEM AND METHOD

TECHNICAL FIELD

The present application relates to methods of replacement of replaceable components of a vehicle braking system, methods of controlling such replacement and a related braking system, controller and software for a controller. In particular the invention relates to methods and systems for ensuring the replacement of friction elements with correctly specified replacement parts.

BACKGROUND

Certain components of brakes have a usable life, following which they must be replaced. Brake pads and brake shoes include friction material which progressively wears away as the brake is used. Electromechanical wear sensors are known which can determine the amount of friction material wear and provide an indication to an operator that the brake pads or shoes require replacement. Also certain components of brakes have a fatigue life. Components made from certain materials (for example steel) to which a load is repeatedly applied and then released can "fatigue" whereby fatigue cracks develop within the component. There comes a point when the fatigue cracks are sufficiently large that the component may fail completely and break apart.

Maintenance cycles and an expected useful life for components of a braking system are generally tested and specified based upon components of a known quality and known materials. Performance and automatic adjustment of braking systems may also be calibrated and specified based upon known characteristics of components installed in a braking system. Replacement of replaceable components in a braking system with components of a different specification, lower strength, faster wear characteristic, or different resilience to braking forces can therefore adversely affect the performance and useful life of a braking system. It is therefore important to ensure that when replaceable components of a braking system are replaced, they are replaced with suitable replacement parts which meet the design specifications of the braking system as specified by the manufacturer of the braking system. The present invention sets out to address these problems.

SUMMARY

A first aspect of the invention provides a method of replacing a replaceable component of a braking system, comprising the steps of: providing a first code to a controller connected to the braking system; causing the controller to: compare the first code with a second code, the second code being associated with a replaceable component of the braking system; such that, in the case that the first code is determined by the controller to be correctly associated with the second code, the controller activates a replacement actuator of the braking system to permit the replacement of the replaceable component in the braking system; and replacing the replaceable component with a replacement component.

The method may further comprise connecting an electronic diagnostic device comprising code input means to the braking system. This allows the system to be expanded to include data input means for inputting codes only when necessary, for example for maintenance or repair.

The connection may be via a CAN bus of a vehicle or machinery comprising the braking system. Connection via a CAN bus allows simple integration and communication via existing systems of the baking system, vehicle or machinery.

The electronic diagnostic device may comprise the controller. This further allows processing and data management means to only be included in the system when maintenance or repair is necessary and limits the carrying out of maintenance to parties having the correct diagnostic equipment and, for example the necessary associated training for improved quality and safety of the maintenance or repair operation.

A further aspect of the invention provides a method of controlling the replacement of a replaceable component in a braking system, the method comprising the steps of: receiving in a controller a first code provided to the controller by a user and a second code associated with the replaceable component of the braking system; determining whether the first code is correctly associated with the second code; and activating a replacement actuator of the braking system to permit the replacement of the replaceable component with a replacement component, in the case that the first code is determined to be correctly associated with the second code.

The methods of the invention include a comparison of first and second codes associated with a replacement component and with components of the system which are to be replaced, respectively. This allows a controller to automatically manage whether the components to be replaced are released from the system or not, which can help to ensure that components are only replaced when a correctly specified set of replacement components is to be used.

The first code may be provided to the controller by at least one of: a manual input, a wireless data communications input, RFID, NFC, a visible light input, a UV light input, an infrared light input, and a mechanical input. Manual input can allow a user to input a code to the system manually avoiding the need for additional equipment if so desired. The input can be further automated by use of electronic communications. Remote electronic communications can help to facilitate the process, by remote electronic communications such as wireless data communications input, RFID (Radio-Frequency Identification), NFC (Near Field Communication), Bluetooth or other remote contactless communications. Visible, Ultraviolet (UV) or Infrared (IR) light may also be used to facilitate the input of data, such as by reading visible 2D or 3D bar-codes or QR-codes, or with such codes being readable only under UV or IR light.

The codes may be associated with the replacement component, by for example being applied to its packaging, purchase data or on a separate tag, or may be provided on the replacement component, by printing with visible or invisible inks, engraving adhesive labels etc.

The replaceable component may comprise at least one of a friction element, a resilient element, an attachment element, a rotor such as a brake disc or drum, or any component designed to be routinely replaced during the life of the braking system.

The replacement actuator may be further arranged to be adjusted to control a running clearance between a friction element of the braking assembly and a corresponding friction surface of the braking assembly. This combined use of an arrangement of the braking assembly, for both control of a running clearance and control of replacement of a component create efficient use of components for multiple purposes.

The replacement actuator may be adjusted by a brake adjustment controller to control the running clearance. The brake adjustment controller may be separate from the controller which controls the release of the replaceable components, or may be at least included in the same controller which controls the release of the replacement actuator. A brake adjustment controller may carry out at least a part of the method of the invention, such as, for example, the step of activating the replacement actuator to retain or release the components, or any steps carried out by a controller in the methods.

One of the first and second codes may comprise a sub-set of a set of characters making up the other of the first and second codes. This can allow an algorithm to define how one code can be associated with the other.

The codes may compared, to determine whether they are correctly associated with one another, by a direct comparison of the codes with one another. This could be to check that one code correctly contains elements of another in accordance with a specified algorithm. Additionally or alternatively, the codes may be checked for correct association with one another by querying a database containing a series of associated first and second codes. This can add to, or replace, the described direct comparison, so that a controller of the database can control correct replacement of parts, or so that a maintenance provide must have access to at least a copy of the database to carry out the replacement.

Upon recognition of an over-ride code being input to the controller, the controller may activate the replacement actuator to permit removal and refitting of the replaceable component. This allows a code to be used to release components, for example when they are not to be replaced, but rather to be reinstalled after maintenance of the components or other components of the braking system.

Upon recognition of a first code, which is not correctly associated with the second code, being input to the controller, a mismatch code may be output by the controller output and the controller may further prevent replacement of the replaceable component.

A further aspect of the invention provides a computer program product adapted to perform some or all of any of the method steps of the invention.

In a further aspect, a controller may be arranged for connection to a braking system, the controller comprising a processor and a memory containing the computer program product for carrying out method steps of the invention.

A still further aspect of the invention provides a braking system comprising a controller arranged to carry out method steps of the invention and a braking assembly, the braking assembly comprising a replacement actuator having a first configuration, in which the replaceable component can be replaced within the braking assembly, and a second configuration, in which the replaceable component cannot be removed from the braking assembly or replacement component cannot be fitted, the controller being arranged to activate the actuator to selectively release or retain the replaceable component or block the replacement component, the replacement actuator preferably being further arranged to be adjusted to control a running clearance between a friction element of the braking assembly and a corresponding friction surface of the braking assembly.

The controller of the system may be comprised in an electronic diagnostic device arranged to be attached to a vehicle or machinery comprising the braking system, for maintenance purposes.

The controller of the system may alternatively be an integral part of the braking system, and may be arranged to receive at least one of the first, second and over-ride codes, preferably from an external electronic device.

The replacement actuator may include either or both of an actuator which is operable to apply the brake, and an adjuster mechanism which is operable to adjust the running clearance of the brake.

The replacement actuator may be a mechanically operated actuator. The replacement actuator or the adjuster mechanism may be electrically operated.

The braking system may include an electrically operated clearance control system for maintaining a desired running clearance between a rotor and a friction surface of a brake pad or brake shoe. The braking system may include a service brake or a parking brake.

BRIEF DESCRIPTION OF THE DRAWINGS

Embodiments of the invention will now be described with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1 to 4 and the following description thereof describe a braking system, a method of determining a zero instantaneous running clearance position of a brake of a braking system and methods for controlling the removal of a brake, which may be carried out using parts of the braking system used for managing a zero instantaneous running clearance position of a brake.

In this case the brake 12 is a service brake, i.e., a brake that is used to slow the vehicle down. The brake 12 may also be used as a parking brake, i.e., a brake used when the vehicle is stationary to prevent the vehicle moving.

Figure 1:
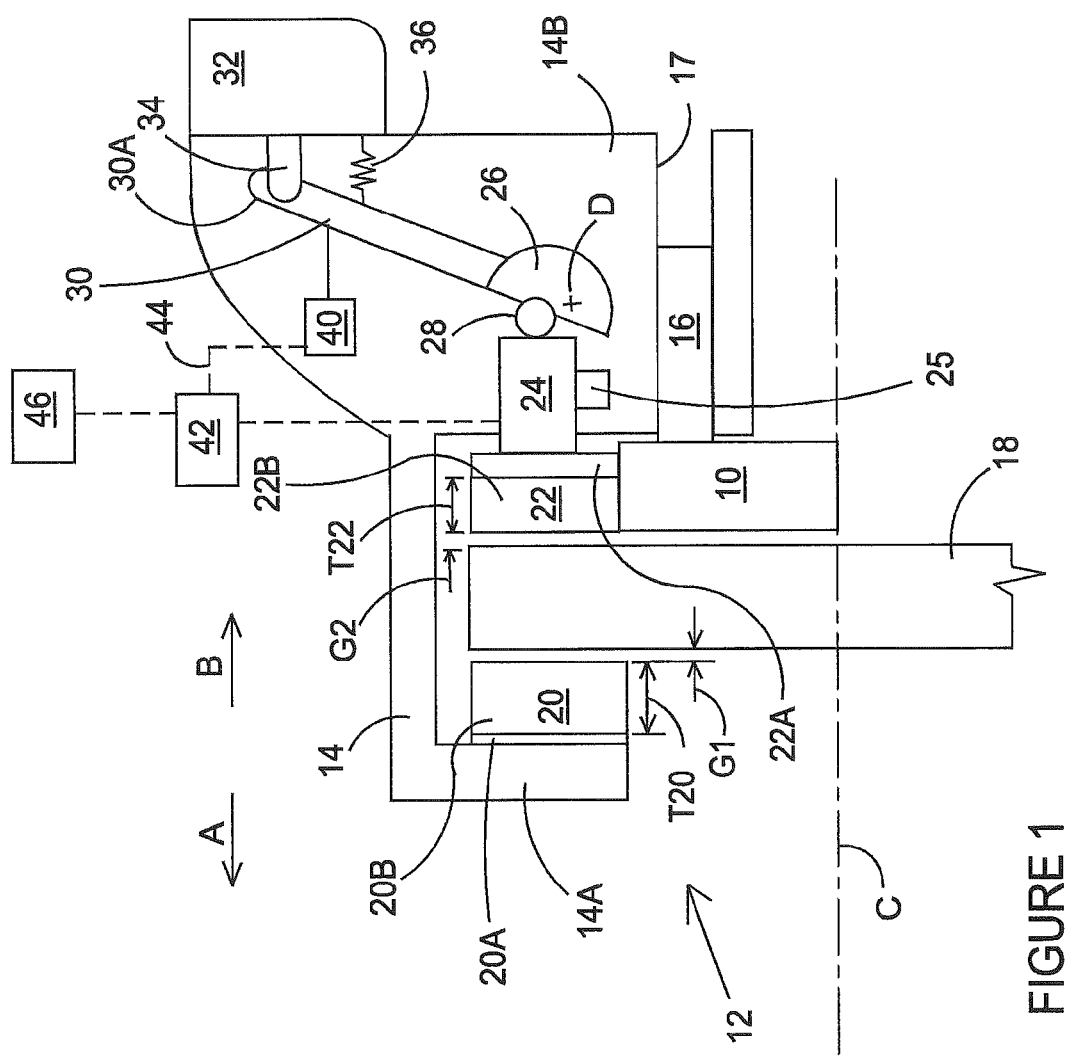
FIG. 1 shows a schematic view of a brake according to the present invention.

With reference to FIG. 1 there is shown a vehicle 10 having a brake 12. The brake 12 includes a caliper 14 which is slidably mounted via pin 16 on the vehicle 10, typically on a suspension component of the vehicle 10. Accordingly the caliper 14 can move in the direction of arrow A and in the direction of arrow B.

The vehicle 10 includes a brake rotor, in this case a brake disc 18 which is rotatably mounted about axis C. The brake disc 18 is rotatably fast with a wheel (not shown) which also rotates about axis C.

Brake pad 20 includes a brake pad back plate 20A and friction material 20B. Brake pad 22 includes a brake pad back plate 22A and friction material 22B.

On opposite axial sides of the brake disc there are brake pads 20 and 22. Adjacent brake pad 22 is an adjuster mechanism 24. An actuation shaft (or operating shaft) 26 is mounted in the caliper 14 and is rotatable about axis D. A roller 28 is supported on the actuation shaft 26 and engages a right hand end (when viewing FIG. 1) of the adjuster mechanism 24.

Actuating lever 30 is attached to the actuation shaft 26. An actuator 32 is mounted on the caliper 14, and includes an actuator rod 34, which engages an end 30A of the actuating lever 30.

The actuator 32 is a mechanically operated actuator, in this case an air operated actuator. The actuator 32 may alternatively be an electrically operated actuator or any non-electrically operated actuator.

As shown in FIG. 1 the brakes are in a released condition, actuating lever 30 having being rotated clockwise about axis D such that a gap G1 exists between brake pad 20 and brake disc 18 and a gap G2 exists between brake pad 22 and brake disc 18. Accordingly, the released running clearance is G1+G2.

In order to apply the brakes the actuator 32 is operated such that the actuator rod extends from the actuator and moves in a direction of arrow A thereby rotating the operating shaft 26 anti-clockwise about axis D. Because the roller 28 is offset from axis D, the roller 28 moves in the direction of arrow A which causes the adjustment mechanism 24 to move in a direction of A which forces the brake pad 22 in the direction of arrow A, thereby closing the gap G2. Continued anti-clockwise rotation of the operating shaft 26 then causes the caliper 14 to move in the direction of arrow B as the hole 17 in the caliper slides on pin 16. This causes gap G1 to close. At this point the instantaneous running clearance is zero but, because the brake pads are not being forced against the brake disc 18, no braking force exists to retard to slow the vehicle. Only when the actuator 32 continues to move the actuator rod 34 in the direction of arrow A, does a clamping force of the brake pads on the discs start to be generated. The clamping (or braking) force is dependent upon, amongst other things, the force in the actuating rod 34, a higher force actuating rod 34 resulting in a higher clamping force and therefore a higher retardation of the vehicle. As the force in actuator rod 34 increases, the elasticity in the various brake components allows for the actuator rod to continue to extend from the actuator and continue to move in the direction of arrow A relative to the actuator, in spite of the fact that the brake pads 20 and 22 are in engagement with the brake disc 18. By way of example, if the brake force is increased, the caliper 14 will start to deflect with the side 14a progressively moving further away from side 14b. Clearly other brake components will deflect as the brake force increases.

By way of example, if the released running clearance as shown in FIG. 1 is 1 mm (e.g., G1=0.5 mm and G2=0.5 mm) and the operating ratio of the operating shaft 26 is approximately 20:1, (i.e., every 20 mm end 30A moves in the direction of arrow A, roller 28 moves 1 mm in the direction of arrow A), then to reduce the instantaneous running clearance to zero requires end 30A to move 20 mm in the direction of arrow A. However, at this point the brakes are not applied. In order to apply the brake end 30A must continue to be moved in the direction of arrow A relative to the actuator 32 and, by way of example, for the brake to be applied relatively heavily, end 30A must extend a further 20 mm, i.e., a total of 40 mm. This 40 mm movement of end 30A causes a roller 28 to "move" total of 2 mm, 1 mm of which closes gaps G1 and G2 and the other 1 mm of which is absorbed in the elasticity of the various components.

The adjuster mechanism 24 is electrically operated by electric motor 25. Thus the adjuster mechanism 24 can be extended (or lengthened) (such that end 24A moves away from end 24B) or retracted (or shortened) (such that end 24A moves towards end 24B) by operation of the electric motor 25. It will be appreciated that by extending the adjuster mechanism 24 the released running clearance will reduce and by retracting (or shortening) the adjuster mechanism 24 the released running clearance will increase.

As will be appreciated, the adjuster mechanism 24 is a distinct component from the actuator 32. The actuator 32 performs the function of applying and releasing the brake. The adjuster mechanism 24 performs the function of adjusting (in particular the running clearance) of the brake. The adjuster mechanism is not used to apply the brake. The actuator mechanism is not used to adjust the running clearance of the brake. The actuator 32 is an air operated actuator though other types of mechanical actuator may be used. The adjuster mechanism 24 is electrically operated, i.e., in order to adjust the adjuster mechanism the electric motor 25 must be operated. Adjuster mechanism 24 may take the form of an extendable piston.

The vehicle 10 includes a sensor 40 and a processor 42, in one embodiment a microprocessor. There is also included a memory 46 such as data storage, such as flash memory.

The sensor 40 in this case is a position sensor and senses the position of the actuating lever 30. The sensor 40 together with the processor 42 and memory 44 can be used to determine the rest position of the actuating lever 30 (as shown in FIG. 1) and can also be used to determine when the instantaneous running clearance has reduced to zero (but the brakes are not applied).

Consider the situation where the vehicle operator applies the brakes heavily. Using the example above, the actuator rod 34 will have moved 40 mm in the direction of arrow A. During the first 20 mm of movement all that occurs is that gap G2 closes and the caliper moves in the direction of arrow B such that gap G1 closes. At this moment, no braking force has yet been applied since the force required to, for example, slide the hole 17 along pin 16 is relatively low and thus the actuator rod 34 moves relatively quickly during its first 20 mm of movement. However, during the second 20 mm of "extension" of rod 34 the clamping force progressively increases and therefore the force required to move end 30A through the final 20 mm of movement increases considerably. This results in the actuator rod 34 extending more slowly over the second 20 mm of movement than over the first 20 mm of movement. By utilizing the sensor 40 to monitor the position of the actuating lever as the brake is applied, it is possible to determine when the instantaneous running clearance reduces to zero. The sensor 40 can also determine the rest position of the actuating lever 30. Knowing the rest position of the actuating lever 30 and the position of the actuating lever 30 when the instantaneous running clearance is zero enables the released running clearance to be determined.

Figure 2:
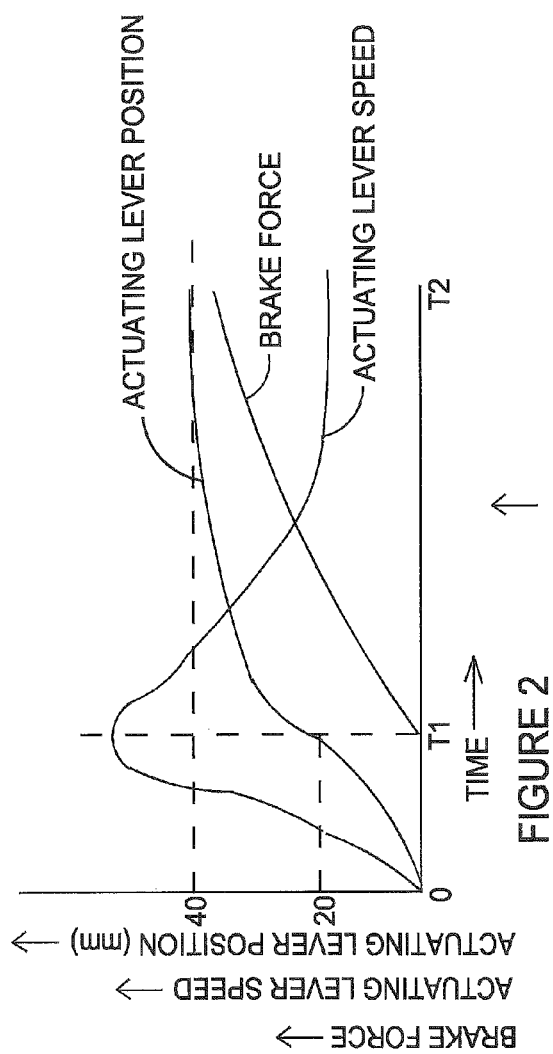
FIGS. 2 and 3 show how the brake force, actuating lever speed and actuating lever position of the brake of FIG. 1 vary with time during a brake application.

In more detail, with reference to FIG. 2 there is shown the position of the end 30A of the actuating lever 30 plotted against time as the vehicle operator demands a heavy braking force. The actuating lever position is sensed by sensor 40. Also shown on FIG. 2 is the actuating lever speed over the same time period and the brake clamp force over the same time period. The following sets out how analysis of this curve can be used to control clearance between brake pad or shoe and brake disc or drum.

At time T0 the actuating lever is positioned as shown in FIG. 1 in the rest condition. This is taken as zero displacement. Because there is an air gap G1, G2, then the brake force is zero. The actuating lever is stationary, and the actuating lever speed is zero.

As time T0 the vehicle operator applies the brakes, which causes the actuator 32 to move the actuator rod 34 in the direction of arrow A. The characteristics of the brake are such that the end 30A of the actuating lever moves as shown on FIG. 2. Since the actuating lever position with respect to time is known, then it is possible to determine the actuating lever speed with respect to time. This has been plotted on FIG. 2. Significantly at time T1 the actuating lever speed has reached a maximum, following which the speed decreases. This maximum speed coincides with the moment when the instantaneous running clearance has reduced to zero. Immediately after this time a clamping force begins to be generated which tends to slow down the speed of actuating lever. At time T2 the actuator rod 34 has extended 40 mm and the actuating lever speed is relatively slower when compared with the peak at time T1. At time T2 the brake force is relatively high.

Figure 3:
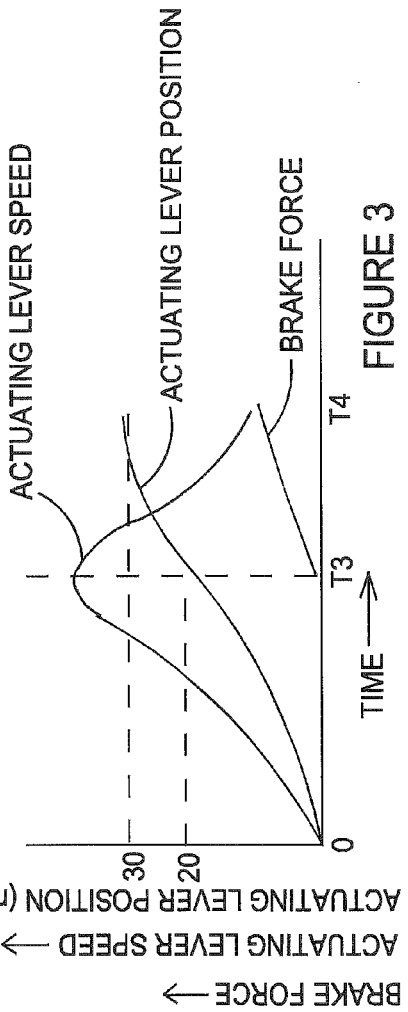

With reference to FIG. 3 there is shown a plot of actuating lever speed, actuating lever position, and brake force with respect to time wherein the vehicle operator has applied the brake relatively slowly and relatively lightly. Under these circumstances it has taken time T3 for the instantaneous running clearance to close to zero. It will be appreciated that the brake has been applied relatively lightly since the maximum displacement of the actuator rod 34 is only 30 mm at time T4. Nevertheless, it will be appreciated that FIG. 3 shows similar characteristics, namely that at the point of maximum lever speed, the instantaneous running clearance has reduced to zero. After this time a clamp force starts to be generated.

Thus, when a new brake has been designed, it may be fitted to a test vehicle and fitted with various instrumentation including, for example, a position sensor monitoring the position of a particular component of the brake assembly, and also a force sensor to measure the clamping force for the caliper. The test vehicle will then be driven and braked under various circumstances. Analysis of the data may show that at or near the zero instantaneous running clearance position of the brake component (as determined by the force sensor), the measured parameter may have a particular characteristic. In the example above, the measured parameter was velocity and the characteristic of the velocity that the point when the brake reached a zero instantaneous running clearance was a peak in the velocity. Understanding how a particular characteristic of a measured parameter relates to a zero instantaneous running clearance position of the brake allows subsequent vehicles (such as production vehicles) which monitor the same parameter, but which do not include a force sensor, be able to determine the zero instantaneous running clearance position of the brake from the measured parameter alone.

In the example above, a peak in the velocity profile of component 30 is a characteristic of the parameter (velocity) which is known (as a result of testing) to be indicative of a zero instantaneous running clearance position of the brake. Subsequent vehicles (such as production vehicles) fitted with a similar brake and with sensor 40, but without any force sensor can determine the zero instantaneous running clearance position of the brake by determining the position of the brake when the parameter (velocity of component 30) has a characteristic (a velocity peak) that is indicative of a zero instantaneous running clearance. This can be carried out by comparing the monitored (or measured) velocity peak with the predetermined characteristic (as measured on the test vehicle). If the measured velocity peak is of a similar profile to the predetermined velocity peak, then the system can determine that the measured velocity peak is indeed indicative of a zero instantaneous running clearance position of the brake. However, under other circumstances, a velocity peak may be produced which is not indicative of zero instantaneous running clearance position of the brake. Under these circumstances the velocity peak can be compared with the predetermined velocity peaks and where they are not sufficiently similar the system can determine that the measured velocity peak was not indicative of a zero instantaneous running clearance position of the brake and therefore ignore this particular velocity peak for the purposes of running clearance adjustment.

As will be appreciated, since it is possible to determine the point of zero instantaneous running clearance by monitoring a single parameter of the brake, only one sensor is required.

Once it is possible to determine the point of zero instantaneous running clearance then it is possible to determine an actual released running clearance. If that actual released running clearance differs from a desired running clearance, then the adjustment mechanism can be adjusted (either by being lengthened or shortened) in order to adjust the actual released running clearance to the desired released running clearance.

As will be appreciated, if wear of friction material has taken place then the adjustment mechanism can be adjusted by being lengthened to compensate for the wear. Alternatively if the brake has become hot through use, then under these circumstances the actual running clearance may decrease. As such, the adjustment mechanism can be adjusted by being shortened in order to increase the actual running clearance to nearer the desired running clearance. Clearly once the brake has cooled, then the adjustment mechanism can again be adjusted by being lengthened to compensate for the now cool brake.

As mentioned above, when the brake is applied, a peak velocity of end 30A coincides with a zero instantaneous running clearance condition. A zero instantaneous running clearance condition can also be determined during brake release. Thus, consider the situation where the brake has been applied relatively heavily. Brake components are under considerable load and they will have elastically deformed. Upon release of the brake, the stored elastic energy in the caliper etc is released and the brake releases to a zero instantaneous running clearance condition relatively quickly. Once at the zero instantaneous running clearance condition, the only forces acting on the actuating lever 30 are relatively light return spring forces designed into the brake to return the actuating lever 30 to the position shown in FIG. 1. Tension spring 36 is a diagrammatical representation of a return spring. Thus, a sudden reduction in the speed of the actuating lever 30 substantially coincides with the point at which the instantaneous running clearance is zero and no braking force.

Figure 4:
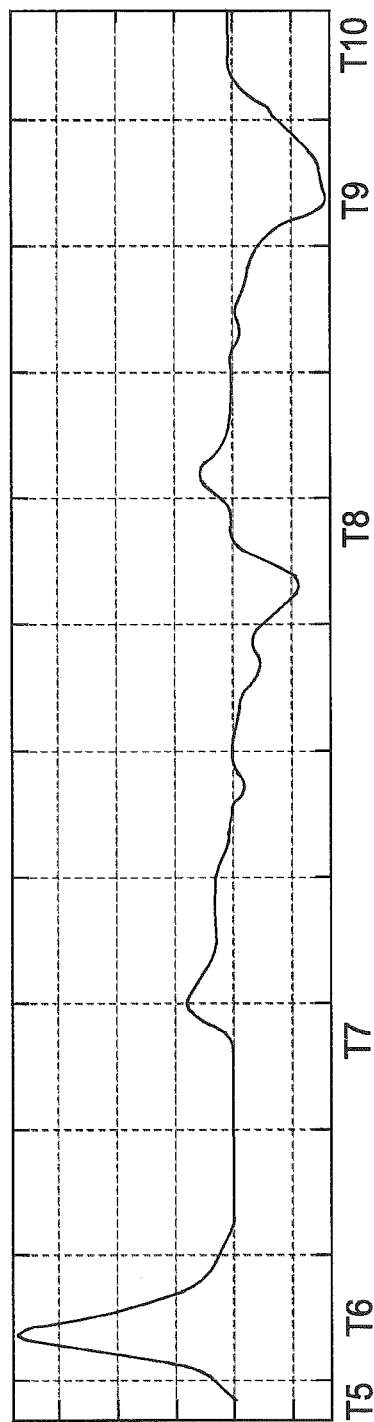
FIG. 4 shows how the actuating lever speed of the brake of FIG. 1 can vary with time during a brake application and subsequent release.

FIG. 4 shows a plot of the actuating lever speed of brake 12 plotted against time during an application and release of the brake. The sequence of events that occurs is as follows:—

Prior to time T5 the brake is in an off condition.

At time T5 the operator starts to apply brake at a reasonably hard pressure.

The peak in the graph at time T6 is an indication that the brake is near a zero instantaneous running clearance position.

Between time T6 and T7 the brake pressure is maintained at a reasonably hard pressure.

Between time T7 and T8 the brake pressure is progressively increased to a very hard pressure and then progressively decreased to a reasonably hard pressure.

Between time T8 and T9 the brake pressure is gradually increased then relatively quickly decreased.

The trough in the graph at time T9 is an indication that the brake is near a zero instantaneous running clearance position during release.

At time T10 the brake is fully released.

The prior application published as EP2650556, filed on 13 Mar. 2013 contains further description of methods for determination of the zero instantaneous running clearance position of a brake and for determining the estimated remaining life of a brake component.

As can be appreciated from that disclosure, an electrically operated clearance control system is able to perform two functions, firstly it is able to maintain a desired running clearance between the rotor and a friction surface of the brake pad or brake shoe. Secondly, it is able to act as a wear indicator. As such the requirement for a separate wear indicator is no longer required and accordingly the cost and space requirement of such a separate mechanical or electro mechanical wear indicator are no longer incurred. In accordance with the methods of the present invention, the system may further be used, in whole or in part, to control the release of brake components or control fitting of new components to permit or deny their replacement.

The system is described with respect to the electrically operated clearance control system as shown in FIGS. 1 to 4 which monitors a single parameter of a brake component in order to determine the zero instantaneous running clearance position and from that ultimately determine when the running clearance is to be adjusted, and from that determine when the brake pads require replacing. It will be appreciated that any prior art electrically operated clearance control system could be used to determine if any usable life remains in a brake component, such as a brake pad, a brake shoe, a brake disc, a brake drum, etc.

It is not essential to have an electrically operated clearance control system. Provided a total number of brake events can be determined, then the processor can determine if any usable life remains in a brake component without the need for any electrically (or mechanically) operated clearance control system. The system described is also capable of determining if any usable fatigue life remains in a brake component. By way of example, consider the actuating lever 30. It is assumed, for example, that actuating lever 30 has a fatigue limit. Throughout the life of the vehicle 10 the brake 12 will be applied typically many hundreds of thousands of times. Each application and release of the brake constitutes one fatigue cycle and in particular for the present example one fatigue cycle of actuating lever 30.

The processor 42 in conjunction with memory 46 may "count" the number of fatigue cycles. Thus, the processor could count the number of times the brake is applied, this being a good indication of a fatigue cycle, i.e., an application and release of the brake.

For ease of explanation, a released running clearance can be described as the sum of the gap between each pad and its associated surface of the brake disc. Under some circumstances a gap can appear between brake pad 20 and that part of caliper 14 which the brake pad engages when the brake is on. Furthermore, a gap can appear between brake pad 22 and that part of the adjuster mechanism 24 which the pad engages when the brake is on. The released running clearance is the sum of gaps G1, G2, any gap existing between pad 20 and caliper 14 and any gap existing between pad 22 and adjuster mechanism 24.

The sensor 40 is a linear sensor. Any type of position sensor could be used including rotary sensors. As shown in FIG. 1, the position of the actuating lever 30 is sensed by sensor 40 and in other embodiments any other component of the brake could be sensed. As mentioned above, sensor 40 is a position sensor and in other embodiments velocity sensors or accelerometers could be used to sense the velocity or acceleration of any brake component. This is possible, since knowing the change of displacement over time allows calculation of velocity and acceleration and similarly knowing the change in speed over time allows calculation of position and acceleration, and similarly knowing change of acceleration over time allows calculation of position and speed. This can be applied to monitoring for a running clearance of the brake, monitoring for a number of fatigue cycles, or for determining whether a braking component has been properly released for replacement or not.

Different embodiments of brakes will have different characteristics, for example the elasticity of components of one embodiment may be different to the elasticity of equivalent components of a second embodiment. A desired released running clearance of one embodiment may be different to a desired released running clearance of another embodiment. Accordingly, a particular embodiment of a brake may be tested to determine the operating characteristics both during application of the brake and during release of the brake. Testing may be carried out at different application rates and different release rates. Testing may be carried out with different release running clearances. Testing may be carried out at different brake temperatures. Testing may be carried out when the brake is new and also when the brake is old. Once testing has been completed for a particular embodiment, the operating characteristics will be known. It will then be possible to programme processor 42 with certain characteristics (or functions) relating to the tested brake. When the brake is applied sensor 40 send a signal (via line 44) to processor 42, this signal will be compared with the predetermined function to determine the actual released running clearance. Processor 42 can compare the actual released running clearance with the desired released running clearance. Any difference between the actual released running clearance and the desired released running clearance can then be corrected by processor 42 commanding the adjustment of adjuster mechanism 24.

Because each particular embodiment (design) of a brake will have its own particular operating characteristic and in particular its own desired released running clearance, the processor associated with that particular design of brake will be programmed with the characteristics (function) of that design. It is therefore important that a braking system as a whole has components which comply with the specifications originally programmed into the system by the manufacturer. This is of particular importance where the braking actions and conditions are monitored to adjust braking performance and running clearance and to estimate the remaining life of components.

The system described above with reference to FIGS. 1 to 4 therefore provides a braking system including an actuator, in adjustment mechanism 24, which can be actuated to control a running clearance between a friction element, such as a pad or shoe, of a brake or braking assembly, and a corresponding friction surface, such as a rotor, disc or drum of the braking assembly.

It is also possible to configure the adjuster mechanism 24 such that, in a first position the adjuster mechanism 24 prevents removal of brake pads 20 and 22. This can be achieved by maintaining a sufficiently small, or zero, clearance between the brake pad 22 or 20 and the brake disc 18, so that the caliper cannot be removed from the brake disc, thus preventing removal of the pads 20 and 22. Alternatively, the adjuster mechanism 24 can be arranged so that a partial or full retraction of the adjuster mechanism is necessary to enable extraction of pads 20 and 22 from the caliper when removed from the brake disc 18. In another alternative, removal of worn pads may be possible, but fitting of replacement pads may not be possible as they require greater retraction of the adjuster mechanism to account for their greater thickness of friction material. Similar arrangements can be envisaged in the context of a drum brake, where an adjuster mechanism can be operated to prevent or allow removal of brake shoes or other related components from a drum brake assembly.

In the alternative, it is possible to provide a separate actuator from the adjuster mechanism 24, which could allow or prevent the release of drum brake shoes or disc brake pads from a braking assembly. Such an actuator may take the form of a solenoid, or an electromagnet, which when energised retains the shoes or pads in position and when de-energised releases the shoes or pads. It may take the form of a permanent magnet, which is de-magnetised or de-energised, by application of a reverse magnetic field, to avoid the need for permanent energising of the electromagnet. Any manner of rotational or linear actuators, arranged to be actuated by electrical, pneumatic or hydraulic input could be used for such a purpose.

As has been set out above, certain components of braking systems are generally designed to be replaceable during the life of the braking system, this is to avoid parts having to be excessively bulky or expensive in order to match the life of a vehicle or machinery to which they are attached. Such replaceable components include connectors, such as clips, nuts and bolts which hold the assembly together, resilient elements such as seals or springs, and friction elements such as brake pads and shoes or brake discs and brake drums. Generally, a certain set of components is replaced during each maintenance cycle. For example, brake shoes or pads may be replaced in combination with springs or related seals or fasteners, such as nuts or bolts which form part of the related assembly. Generally, the key replaceable component in the maintenance cycle of a braking system is a friction element such as a pad or shoe and if this element cannot be replaced, then it is generally not advisable, possibly very difficult or even impossible to replace the other components. Controlling whether or not a friction element is released from a braking assembly for replacement can therefore be an effective means of determining whether a full set of replacement components can be installed on a vehicle or not.

It can be important from the point of view of quality, performance and, more importantly, safety of a vehicle to which brake pads are applied, that those brake pads meet the design specifications of the vehicle and of the control and adjustment aspects of the braking system as defined by the manufacturer. If a resilient element, retaining element, or a friction element of a braking assembly does not have the expected wear characteristics, friction characteristics or strength characteristics, then the braking assembly may operate outside of the normal parameters within which the system is designed to operate. This can lead to faulty, defective, or in the extreme, dangerous operating conditions and so it is desirable to ensure that a replacement component which is to be installed in place of a replaceable component of a braking system has been manufactured according to the required specifications.

Identification codes can be used to identify a place, a vendor, or a supplier of origin of a replacement set of components for a braking system. As will be described in the following, it is possible to set up a coding system which permits the automatic checking the origin of a replacement part or a set of replacement parts or components for the braking assembly.

For clarity of explanation in the following, the term 'parts' is applied to a set of new replacement parts intended to replace components of a vehicle braking system. The term 'components' is used to denote components in the braking system which are to be replaced by the new replacement parts.

A first code may be associated with a part or set of replacement parts, and a second code may be associated with a set of replaceable components, or a single component of the braking system on a vehicle or machinery. By ensuring that the code associated with the replacement parts and the code associated with the replaceable components of the system correspond correctly to one another, a determination can be made of whether the replacement parts are correctly specified in relation to the parts to be replaced and therefore correctly manufactured and suitable for the braking system and vehicle or machinery to which they will be applied.

An example of a coding system which may be employed is as follows.

A code associated with a component or a set of components may comprise sub-codes as follows:

A supplier may have a code which is generated based upon both the supplier name for the components and the manufacturer of the braking system. For example, this may be generated by the first letter of the supplier name representing an Nth letter of the alphabet, while a system manufacturer code may be allocated a number. By multiplying N by the manufacturer number, a combined code is generated defining the parts supplier and the system manufacturer. For Example:

Supplier begins with J=10 letter in the alphabet;
Manufacturer code=7;
Combined supplier and manufacturer code=7×10=70

A pair of pads in the set may have separate three digit numbers, for example, 123 and 456. These may be mapped according to the number of the letter in the alphabet or according to the reverse of the alphabet, starting from Z proceeding backwards, for example 123 and 456 could equate to ZYX and WVU.

A set of pad springs may be identified by ABC and DEF in the alphabetical form. These codes may be converted by mapping a first half from alpha numeric characters to numbers and optionally by mapping the second half directly, in this way ABC and DEF become coded 123 and DEF.

A set of bolts may have original codes ABC and 123 and these may be converted in a similar way between numerical and alpha numeric codes to be given the codes 123 and ABC.

These codes can then be concatenated to create a primary code for a set of components, which in the above case would be 70ZYXWVU123DEF123ABC. This may be known as a code A.

A complimentary code can be created and assigned to a pad replacement kit. Therefore the primary code may belong to the primary set of components installed on the vehicle, to which the vehicle's control systems may be calibrated during the manufacturing process.

A code B can be developed and assigned to a part or set of parts making up a brake pad replacement kit. The code B may be a function of code A, for example, by including components that build up code A. For example, a code B based upon the above primary code or code A, may be 7ZXCA2123, which in this case comprises the first, third, fifth, last, third from last, fifth from last and the original code for the first pad spring. Other combinations or algorithms for creating a code B from a code A can be envisaged. For example, a cryptographic hash function could be used to improve security of use of the codes. This can assist in avoiding duplicate use of one code for different sets of pads. Cryptographic hash functions can also be used in a similar manner to ordinary hash functions. Uses can include indexing data in hash tables, fingerprinting and detection of duplicate data or to uniquely identify files. This can help avoid the use of a single code in multiple instances. Hash codes or cryptographic hash codes could also be used as checksums to detect data corruption in the codes used. Other numerical functions, relating the first and second codes, for a set of components to be replaced and a set of replacement parts, can therefore also be envisaged. In this way, the first and second codes can be authenticated by direct comparison with one another and, additionally or alternatively, they may be authenticated by comparison with a master database.

A manufacturer of the braking system can develop a computer database which correlates all of the code A numbers with their corresponding, or suitable, code B numbers. Additionally or alternatively, an algorithm can be created which could carry out a direct comparison to check whether the code B is indeed correctly composed of sub-components of the code A in a manner such as is described above.

Therefore, by carrying out a comparison of code A of the components installed on the vehicle and code B for the replacement parts kit, it can be determined whether the replacement parts are correctly matched to the system to which they are intended to be installed. It will be appreciated that this comparison could be carried out on onboard systems of the braking system, or of the vehicle or machinery to which the braking system is applied. Alternatively, a separate electronic device can be used to receive data associated with the vehicle systems and data associated with the replacement kit and to carry out the necessary comparisons.

It is possible for an electronic device to be connected to the CAN (Controller Area Network) database of the vehicle for maintenance or diagnostic purposes, via a connection to the CAN bus. A code associated with current components of a braking system can be stored in the CAN database of a vehicle when either the initial set of components, or any replacement parts is installed on the vehicle. This enables a record of the components installed on the vehicle to be carried electronically with the vehicle. Alternatively, a master database may be held which keeps a record of all component sets carried on all vehicles, or all replacement part codes which are suitable for all vehicles.

PIDs (Parameter IDs) and DIDs (Data IDs) from the CAN (Controller Area Network) database of the vehicle can be written and queried in the code comparison process and they can thus be used for code-matching during a pad replacement process. These can be directly compared with the code for a replacement kit of components, or alternatively, codes may be read from the vehicle and replacement kit and compared in a database in a diagnostic device.

In an example embodiment, a technician in a garage enters a pad replacement kit code in the relevant PID or DID row of a database program on a diagnostic device and presses, for example, a button marked Check Code Match.

The diagnostic device then carries out a code comparison to determine whether the replacement kit code is correctly associated with the component code held in the database for the system in question.

If the answer is positive, then the device carrying out the comparison can actuate a replacement actuator of the braking system to release the relevant components from the braking system or provide sufficient clearance to enable an unworn part to be fitted in place of a worn component. This can, for example, be by retraction of the adjuster mechanism 24, or by another, separate, actuator for releasing components from the braking system.

If the codes mismatch, either because they do not match the required codes in the database, or because they do not meet the requirements of the first code containing a sub-set of components of the second code in the required form or sequence, then the device may present a message to the user saying "No pad replacement possible—Check Code".

The technician operating the device would then be able to re-check and re-enter the code for the pad replacement kit, or re-read the code from the vehicle to ensure that this had not been misread or corrupted during transfer. The device may be configured to allow three attempts before placing the device or the braking system in a locked-down configuration. It may then be necessary to contact the original manufacturer to retrieve an unlock code, thus further allowing the manufacturer to retain control of what pads or components are installed in its systems, to ensure correct operation of the systems in line with the original specifications.

However, there are cases where components of the brake may need to be removed for inspection and then re-fitted, or removed due to some other failure in the braking system, for example, mechanical failures such as worn bearings, worn or corroded discs, warped discs, or any other failure necessitating brake component removal and re-fitting. To enable this action, a user input command may be allowed where a user can input either an over-ride code, or a selection indicating the cause for pad removal. The system can then ascertain whether the user intends to remove the pads due to the failure of other components. Actuation of a replacement actuator would then be permitted to allow the necessary components to be removed from the braking system and replaced. Other forms of over-ride code may be a master code held by the manufacturer, a series of over-ride codes held in a remote or local database, or a code provided directly to the system remotely, for example via an internet or mobile communications connection. Such a remote code may be communicated directly by the manufacturer to maintain control over such non-replacement removal operations.

A code associated with the current or standard components for the vehicle system will generally be held on the vehicle or in a master database. The code associated with the replacement part may be applied to packaging of the replacement parts, may be applied to the replacement parts themselves, or may be embedded electronically in data-retaining-and-communication means applied to the components, such as RFID chips, or NFC technology. Various other means of applying the codes may be envisaged, such as codes readable by visible light, such as one- or two-dimensional bar codes, commonly known as QR codes, and they may be applied in such a form as to be readable only under ultraviolet light or by infrared light. In this way, it may be necessary to have a particular scanning device for reading the code and transmitting it to the controller managing the release of the replaceable components of the braking system.

Different arrangements of the system of the invention can be envisaged, in which the controller controlling whether the pad is able to be replaced or not is located either on the vehicle or machinery comprising the braking system, where the replacement-logic, and optionally the data comparison, is carried out in the on-board data and control systems. Alternatively, the database, processing means and/or the related memory may be held in an electronic diagnostic device, commonly known as a diagnostic toolbox. That device may include data input means for inputting a code relating to the replacement parts. The device may also comprise a connector for connecting to the CAN bus of a vehicle or machinery to read codes from on-board systems.

The actuator for enabling the controlled replacement of the components from the system may be termed a replacement actuator. As discussed above, this can be a part of a system for controlling a running clearance between a pad and a disc of the braking assembly. That system may comprise a running clearance controller and the running clearance controller may be used to actuate the replacement actuator to release the pads or shoes or other components from the system. Alternatively, an external electronic device or diagnostic tool might be directly connected to the replacement actuator to actuate it to open sufficiently to permit the fitting of replacement parts of the braking assembly, this external electronic device may need to provide power to the actuator to actuate it, or may simply send a direct control signal to activate the actuator, the actuator taking power from the braking system.

The methods described in relation to the present invention may be carried out by a controller executing instructions based upon a computer program product and thus a computer program product can be adapted to perform some or all of the steps of the methods described herein.

An electronic device, diagnostic tool, or a control system of a vehicle or of a braking system can therefore be arranged as a controller, carrying out instructions, by running a computer program, to carry out the steps associated with the methods described herein. A controller of the invention may therefore form a part of the vehicle braking system, or may be comprised in an external electronic device for carrying out the method when connected to a vehicle, or to a braking system.

Figure 5:
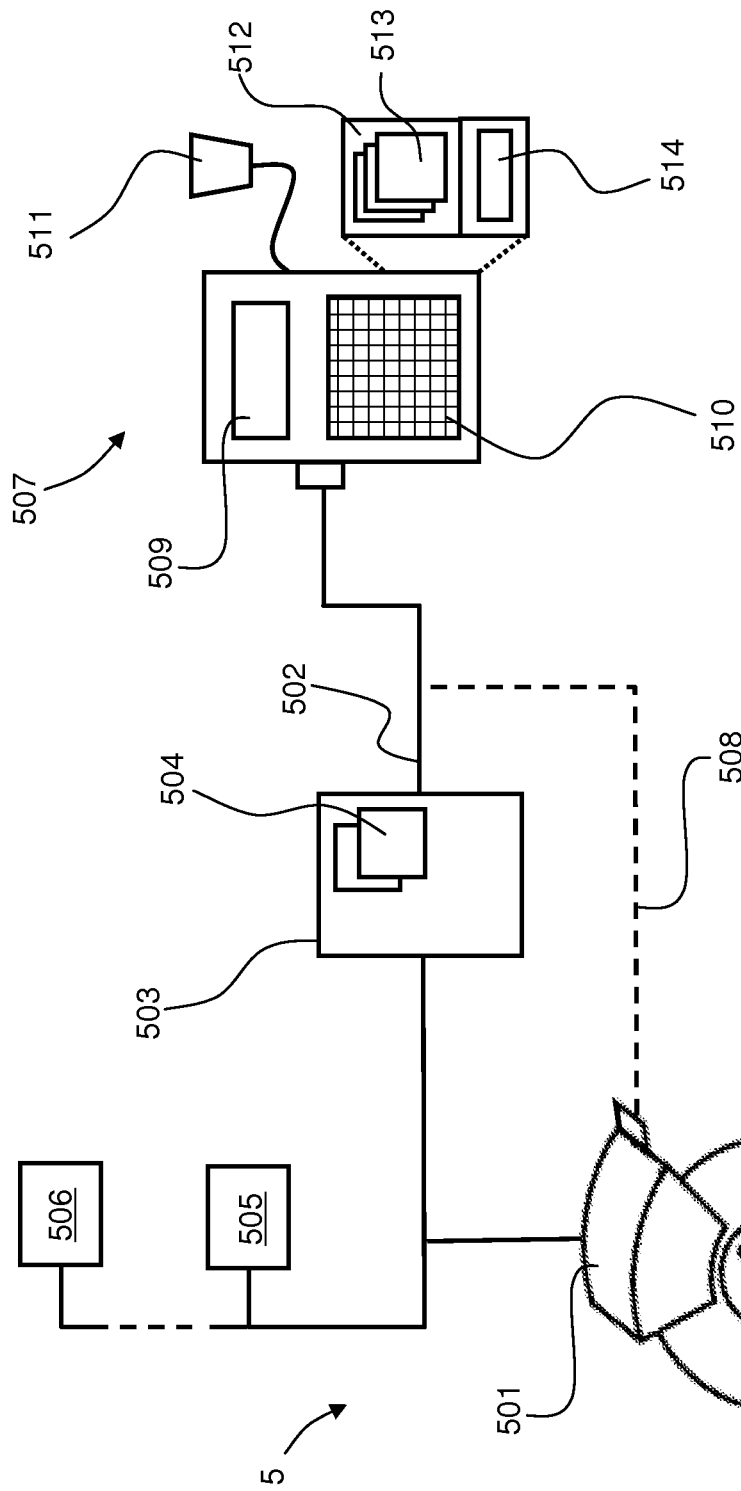
FIG. 5 shows a schematic representation of an external electronic device of the invention connected to a system of the invention.

An example of such a device, connected into a system of the invention, is illustrated in FIG. 5. The system 5 includes a brake 501, which may be connected to a CAN bus of the system 5 via data connection to the CAN bus 502, although it is not essential that the brake be connected electronically to the CAN bus, the brake and CAN bus may simply be separate parts of the same machinery or vehicle. The CAN bus 502 is connected to a controller 503, which may contain a database 504 carrying data relating to various parameters of the system and of the vehicle or machinery to which it is installed. The CAN bus may include further connections to other parts of the vehicle or machinery, such as engine management systems 505, and safety systems 506.

An electronic diagnostic tool 507 is connected to the CAN bus controller 503 directly, or via CAN bus 502 in some examples. When connected to the CAN bus controller 503, the diagnostic tool 507 can query the database 504 of the CAN bus controller and so can compare a code from the CAN bus database 504 with another code and can replace the code or codes in the database, if necessary, once components of the braking system 5 have been replaced with replacement parts. In an alternative arrangement, the diagnostic tool 507 may be alternatively or additionally be connected directly to the brake 501 by a connection indicated by line 508. In this case the diagnostic tool can provide direct control signals and/or power to the brake to actuate the replacement actuator when the required conditions described in the above are met.

The diagnostic tool 507 may include a screen 509 for displaying information to a user, a keypad 510 for manual data input and a scanning device 511 for reading codes from the replacement parts, for comparison with codes read from the CAN bus controller database 504, or from the components to be replaced. The diagnostic tool 507 may include a memory 512. The memory 512 may comprise a database holding records 513 for components of the system 5. The records 513 may comprise codes for comparison as described above, to verify whether replacement parts correspond correctly to the components of the system to be replaced. The memory 512 may include a computer program product 514 of the invention, for execution by a controller in the diagnostic tool 507, to carry out the methods of the invention described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of replacing a replaceable component of a braking system, the method comprising:
    providing a first code to a controller connected to the braking system;
    causing the controller to:
        compare the first code with a second code, the second code being associated with the replaceable component of the braking system;
        wherein the controller activates a replacement actuator of the braking system to permit replacement of the replaceable component from the braking system when the first code is determined by the controller to be correctly associated with the second code; and
    replacing the replaceable component with a replacement component.

2. The method of claim 1 further comprising connecting an electronic diagnostic device having code input means to the braking system.

3. The method of claim 2 wherein the electronic diagnostic device is connected to the braking system via a CAN bus of a vehicle that includes the braking system.

4. The method of claim 2 wherein the electronic diagnostic device includes the controller.

5. The method of claim 1 wherein one of the first and second codes comprises a sub-set of a set of characters making up the other of the first and second codes;
    the codes being compared by at least one of:
        a direct comparison of the codes with one another; and
        by querying a database containing a series of associated first and second codes;
    to determine whether the second code is correctly associated with the first code.

6. A method of controlling replacement of a replaceable component in a braking system, the method comprising:
    receiving in a controller a first code provided to the controller by a user and a second code associated with the replaceable component of the braking system;
    determining whether the first code is correctly associated with the second code; and
    activating a replacement actuator of the braking system to permit the replacement of the replaceable component with a replacement component when the first code is determined to be correctly associated with the second code.

7. The method of claim 6 wherein the first code is provided to the controller by at least one of: a manual input, a wireless data communications input, RFID, NFC, a visible light input, a UV light input, an infrared light input, and a mechanical input, wherein the first code is associated with the replacement component.

8. The method of claim 6 wherein the first code is provided on the replacement component.

9. The method of claim 6 wherein the replaceable component comprises at least one of a friction element, a rotor such as a brake disc or drum, a resilient element, an attachment element or any component designed to be routinely replaced during life of the braking system.

10. The method of claim 6 wherein the replacement actuator is further arranged to be adjusted to control a running clearance between a friction element of the braking system and a corresponding friction surface of the braking system.

11. The method of claim 10 wherein the replacement actuator is adjusted by a brake adjustment controller to control the running clearance.

12. The method of claim 6 wherein upon recognition of an over-ride code being input to the controller, the controller activates the replacement actuator to permit removal and refitting of the replaceable component.

13. The method of claim 6 wherein upon recognition that the first code is not correctly associated with the second code, a mismatch code is output by the controller and the controller prevents replacement of the replaceable component.

14. A braking system comprising:
a controller and a braking assembly, the braking assembly including a replacement actuator having a first configuration, in which a replaceable component can be replaced within the braking assembly, and a second configuration, in which the replaceable component cannot be replaced within the braking assembly, the controller being arranged to activate the replacement actuator to selectively permit or prevent replacement of the replaceable component.

15. The braking system of claim 14 wherein the replacement actuator is further arranged to be adjusted to control a running clearance between a friction element of the braking assembly and a corresponding friction surface of the braking assembly.

16. The braking system of claim 14 wherein the controller is an electronic diagnostic device arranged to be attached to a vehicle that includes the braking system, for maintenance purposes.

17. The braking system of claim 14 wherein the controller is an integral part of the braking system and is arranged to receive at least one of a first code, a second code, and an over-ride code.

18. The braking system of claim 17 wherein the controller receives at least one of the first code, the second code, and the over-ride code from an external electronic device.

* * * * *